US011909541B1

(12) United States Patent
Nakajima et al.

(10) Patent No.: US 11,909,541 B1
(45) Date of Patent: Feb. 20, 2024

(54) MANAGEMENT METHOD, MANAGEMENT DEVICE, AND RECORDING MEDIUM

(71) Applicant: Hitachi, Ltd., Tokyo (JP)

(72) Inventors: Jun Nakajima, Tokyo (JP); Noriko Nakajima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 18/114,498

(22) Filed: Feb. 27, 2023

(30) Foreign Application Priority Data

Aug. 26, 2022 (JP) .................................. 2022-135361

(51) Int. Cl.
*H04L 29/08* (2006.01)
*H04L 12/14* (2006.01)
*G06F 16/11* (2019.01)

(52) U.S. Cl.
CPC .......... *H04L 12/141* (2013.01); *G06F 16/122* (2019.01)

(58) Field of Classification Search
CPC .............................. H04L 12/141; G06F 16/122
See application file for complete search history.

(56) References Cited

U.S. PATENT DOCUMENTS

| 2008/0140469 | A1* | 6/2008 | Iqbal | ...................... G06Q 10/04 705/7.37 |
| 2015/0019301 | A1 | 1/2015 | Jung et al. | |
| 2018/0329477 | A1* | 11/2018 | Goda | ...................... G06F 3/067 |
| 2021/0105223 | A1* | 4/2021 | Jutori | .................... G06F 11/302 |

* cited by examiner

*Primary Examiner* — Kim T Nguyen
(74) *Attorney, Agent, or Firm* — Mattingly & Malur, PC

(57) ABSTRACT

A management device executes an acquisition process of acquiring configuration management information including at least the first storage region and the second storage region; an extraction process of extracting, from the cost calculation rule table, the cost calculation formula in the second storage region included in the configuration management information acquired in the acquisition process; a first calculation process of calculating a cost estimate value by the cost calculation formula by acquiring, from the performance/capacity history table, a value to be substituted in as a variable of the cost calculation formula; a creation process of creating a cost estimate result including a cost estimate value calculated in the first calculation process, the first storage region, the second storage region, and the type of the usage configuration using the second storage region; and an output process of outputting the cost estimate result created in the creation process.

11 Claims, 13 Drawing Sheets

122 — PERFORMANCE/ CAPACITY HISTORY TABLE

| ACQUISITION DATE/TIME (401) | RELEVANT NODE (402) | | | OBSERVATION ITEM (403) | OBSERVATION VALUE (404) |
|---|---|---|---|---|---|
| | DATA CENTER (411) | STORAGE (412) | DEVICE (413) | | |
| 2022/05/18/ 13:30 | DC1 | S T 1-1 | DV1 | CAPACITY | 100GB |
| 2022/05/18/ 13:30 | DC1 | S T 1-1 | DV1 | WRITE IOPS | 1000 |
| 2022/05/18/ 13:35 | DC1 | S T 1-1 | DV1 | CAPACITY | 101GB |
| 2022/05/18/ 13:35 | DC1 | S T 1-1 | DV1 | WRITE IOPS | 200 |

*FIG. 4*

123 — COST MANAGEMENT TABLE

| DATE (501) | DATA CENTER (502) | SERVICE (503) | SERVICE INSTANCE (504) | SERVICE COST (505) |
|---|---|---|---|---|
| 2022/05/19 | DC2 | STORAGE | STORAGE 2 | $90 |
| 2022/05/19 | DC2 | STORAGE | STORAGE 4 | $10 |
| 2022/05/19 | DC4 | COMPUTE | SERVER 1 | $30 |
| 2022/05/20 | DC2 | STORAGE | STORAGE 2 | $92 |
| 2022/05/20 | DC2 | STORAGE | STORAGE 4 | $10 |
| 2022/05/20 | DC4 | COMPUTE | SERVER 1 | $500 |

*FIG. 5*

| | POLICY NAME | CONDITION |
|---|---|---|
| | COST PRIORITY | — |
| | COST RESTRICTION | $10,000/MONTH |
| | PERFORMANCE PRIORITY | — |
| | RTO RESTRICTION | 1H OR LESS |

801 802
126 POLICY

MANAGEMENT METHOD, MANAGEMENT DEVICE, AND RECORDING MEDIUM

CLAIM OF PRIORITY

The present application claims priority from Japanese patent application No. 2022-135361 filed on Aug. 26, 2022, the content of which is hereby incorporated by reference into this application.

BACKGROUND

The present invention relates to a management method, a management device, and a recording medium.

IT system departments of customers that have used on-premise systems need to optimize costs, and therefore, are seeking to use public cloud systems. However, it is difficult to estimate the cost of using public clouds, and the cost is often greater than expected.

US-A1-2015/0019301 discloses that a system and method for providing cloud performance capability estimation and supporting recommender systems by simulating bottleneck and its migration for any given complex application in a cost-efficient way are provided.

In US-A1-2015/0019301, first, the system and method builds an abstract performance model for an application based on the resource usage pattern of the application in an in-house test-bed (i.e., a white-box environment).

Second, it computes relative performance scores of many different cloud configurations given from black-boxed clouds using a cloud metering system.

Third, it applies the collected performance scores into the abstract performance model to estimate performance capabilities and potential bottleneck situations of those cloud configurations.

Finally, using the model, it can support recommender systems by providing performance estimates and simulations of bottlenecks and bottleneck migrations between resource sub-systems while new resources are added or replaced.

However, with the configuration of Patent Document 1, it is impossible to properly estimate public cloud usage costs prior to the start of operation of a public cloud configuration. For example, if there is a configuration that connects an on-premise system to a public cloud, it is difficult for a user to input the public cloud usage while taking into consideration the aforementioned configuration. In addition, the hybrid cloud configuration needs to be operated to a certain degree before it is possible to estimate the cost of use for public cloud resources having a hybrid cloud configuration.

SUMMARY

An object of the present invention is to optimize estimation of usage costs.

The disclosure is a management method executed by a management device that manages a usage configuration of a service provided between first devices of a first device group and second devices of a second device group, wherein the management device has a processor that executes a program, and a storage device that stores the program, wherein the storage device has a configuration management table, a cost calculation rule table, and a performance/capacity history table, wherein the configuration management table stores a first storage region of the first devices, a second storage region of the second devices, and a type of the usage configuration, wherein the performance/capacity history table stores an observation item in the first storage region, an observation value pertaining to the observation item, and an acquisition date/time of the observation value, wherein the cost calculation rule table stores one or more cost calculation formulas that serve as rules for calculating a cost for use of the second storage region according to the type of the usage configuration on the basis of at least one of the first storage region, the observation value, and the acquisition date/time, and wherein, in the management method, the processor executes: an acquisition process of acquiring configuration management information including at least the first storage region and the second storage region; an extraction process of extracting, from the cost calculation rule table, the cost calculation formula in the second storage region included in the configuration management information acquired in the acquisition process; a first calculation process of calculating a cost estimate value by the cost calculation formula by acquiring, from the performance/capacity history table, a value to be substituted in as a variable of the cost calculation formula; a creation process of creating a cost estimate result including a cost estimate value calculated in the first calculation process, the first storage region, the second storage region, and the type of the usage configuration using the second storage region; and an output process of outputting the cost estimate result created in the creation process.

According to a typical embodiment of the present invention, it is possible to optimize estimation of usage costs. The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a descriptive view showing an example of the performance/capacity history table.

FIG. 5 is a descriptive view showing an example of the cost management table.

DETAILED DESCRIPTION OF THE EMBODIMENTS

<System Configuration Example of Hybrid Cloud System>

Figure 1:
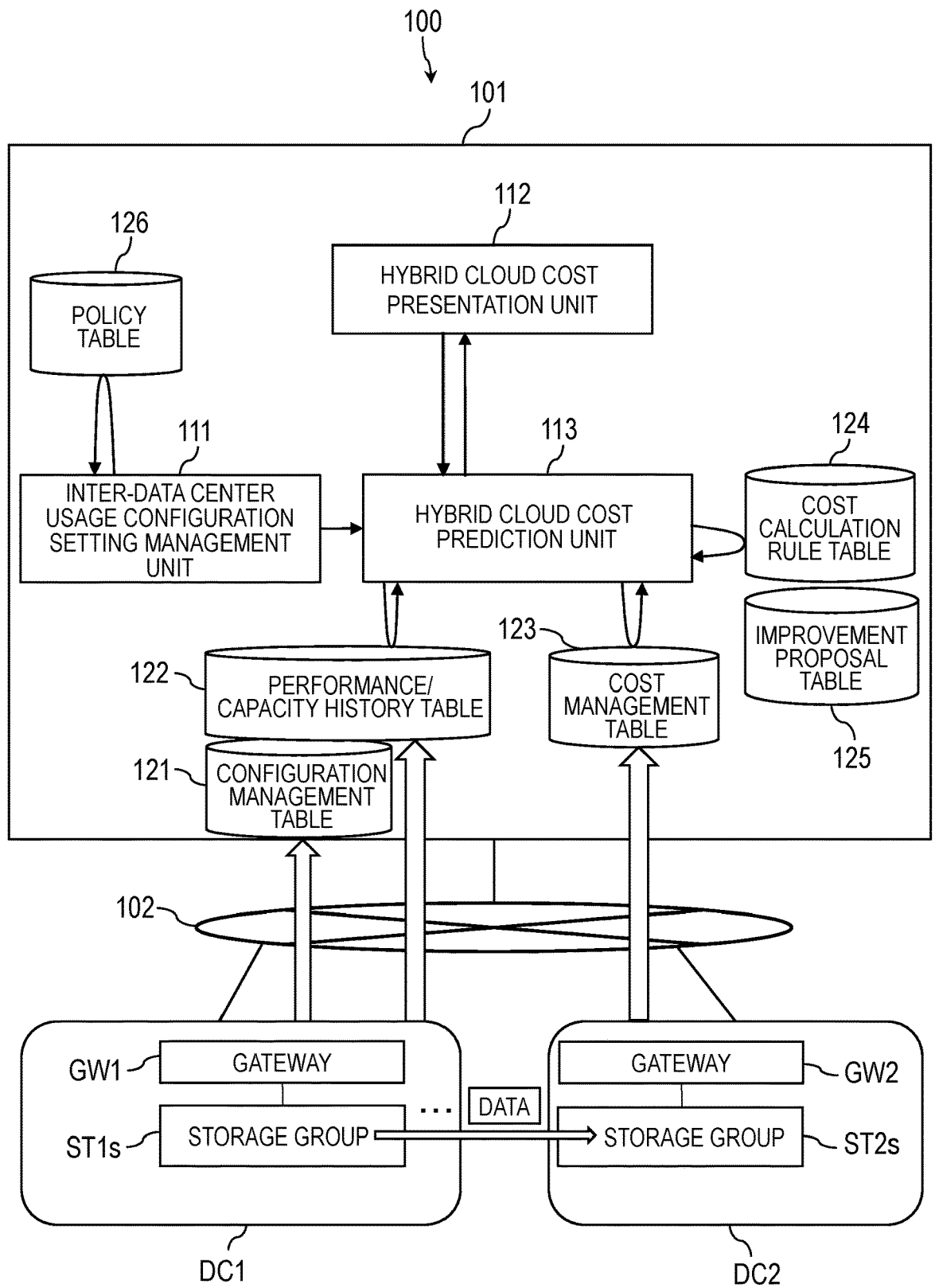
FIG. 1 is a block diagram showing a system configuration example of a hybrid cloud system.

FIG. 1 is a block diagram showing a system configuration example of a hybrid cloud system. A hybrid cloud system 100 has a management server 101, a source-side data center DC1 (e.g., of an on-premise type) that is a backup source, and a target-side data center DC2 (e.g., of a public cloud type) that is a backup destination (the reference character "DC" is used if not distinguishing between "DC1" and "DC2").

The management server 101 and the data center DC are connected in a manner enabling communication therebetween via a network 102 such as the internet, a LAN (local area network), or a WAN (wide area network). The hybrid cloud system 100 is a cloud system that can connect the data centers DC (on-premise to public cloud) to each other and enable creation of a configuration in which one data center can use services provided by the other data center (hereinafter referred to as the "usage configuration").

In this configuration, each data center DC can be an on-premise system or a public cloud, but the target-side data center DC that is the backup destination is assumed to provide an environment in which cost management is performed according to the service used. The environment in which cost management is performed is typically a public cloud, and the targeting data center DC (source-side data center DC) that uses the public cloud as the target destination is often of an on-premise type. Thus, the description below will use, as an example, a configuration in which the connection between the data centers DC is between an on-premise system and a public cloud, but the configuration is not limited thereto, as long as the target-side data center DC, which is the backup destination, provides an environment in which cost management is performed according to the service used.

The management server 101 has an inter-data center usage configuration setting management unit 111, a hybrid cloud cost presentation unit 112, and a hybrid cloud cost prediction unit 113.

The inter-data center usage configuration setting management unit 111 presents the cost incurred for settings pertaining to the usage configuration when planning and executing a management operation.

In the hybrid cloud cost presentation unit 112, when confirming actual costs and estimating costs, costs arising from the settings pertaining to the usage configuration are presented separately from other costs.

The hybrid cloud cost prediction unit 113 estimates the cost based on the setting content for the usage configuration according to an instruction from the inter-data center usage configuration setting management unit 111 and the hybrid cloud cost presentation unit 112, and returns this estimate to the inter-data center usage configuration setting management unit 111 and the hybrid cloud cost presentation unit 112.

The management server 101 has a configuration management table 121, a performance/capacity history table 122, a cost management table 123, a cost calculation rule table 124, an improvement proposal table 125, and a policy table 126.

The configuration management table 121 is a table for managing the usage configuration. Details will be described later with reference to FIG. 3.

The performance/capacity history table 122 is a table that stores history information of the performance of the data center DC and the capacity of the storage ST in the data center DC. Details will be described later with reference to FIG. 4.

The cost management table 123 is a table for managing the cost of the service used by the data center DC. Details will be described later with reference to FIG. 5.

The cost calculation rule table 124 stores a cost calculation rule for each set of the data center DC to which the connection is to be made, the storage type, and the management operation for the connection between an on-premise system (DC1) and a public cloud system (DC2). Details will be described later with reference to FIG. 6.

The improvement proposal table 125 is a table that stores improvement proposals for reducing cost. Details will be described later with reference to FIG. 7.

The policy table 126 is a table that stores policies such as cost priority for setting cost as the top consideration for setting a backup, and RTO priority for setting the recovery time objective (RTO) as the top priority for setting a remote copy. The policy table 126 is set in advance by the user of the management server 101. Details will be described later with reference to FIG. 8.

The source-side data center DC1 that is the backup source (e.g., the on-premise type) has a gateway GW1 and a storage group ST1s. The storage in the storage group ST1s is referred to as the "storage ST1." If there are a plurality of storages ST1, then a suffix is added to the end of the reference character.

The target-side data center DC2 that is the backup destination (e.g., the public cloud type) has a gateway GW2 and a storage group ST2s. The storage in the storage group ST2s is referred to as the "storage ST2." If there are a plurality of storages ST2, then a suffix is added to the end of the reference character.

If not distinguishing between the gateways GW1 and GW2, the gateways are collectively referred to as the "gateways GW." If not distinguishing between the storage groups ST1s and ST2s, the storage groups are collectively referred to as the storage groups STs. The storages in the storage groups STs are referred to as the "storages ST."

<Hardware Configuration Example of Computer>

Figure 2:
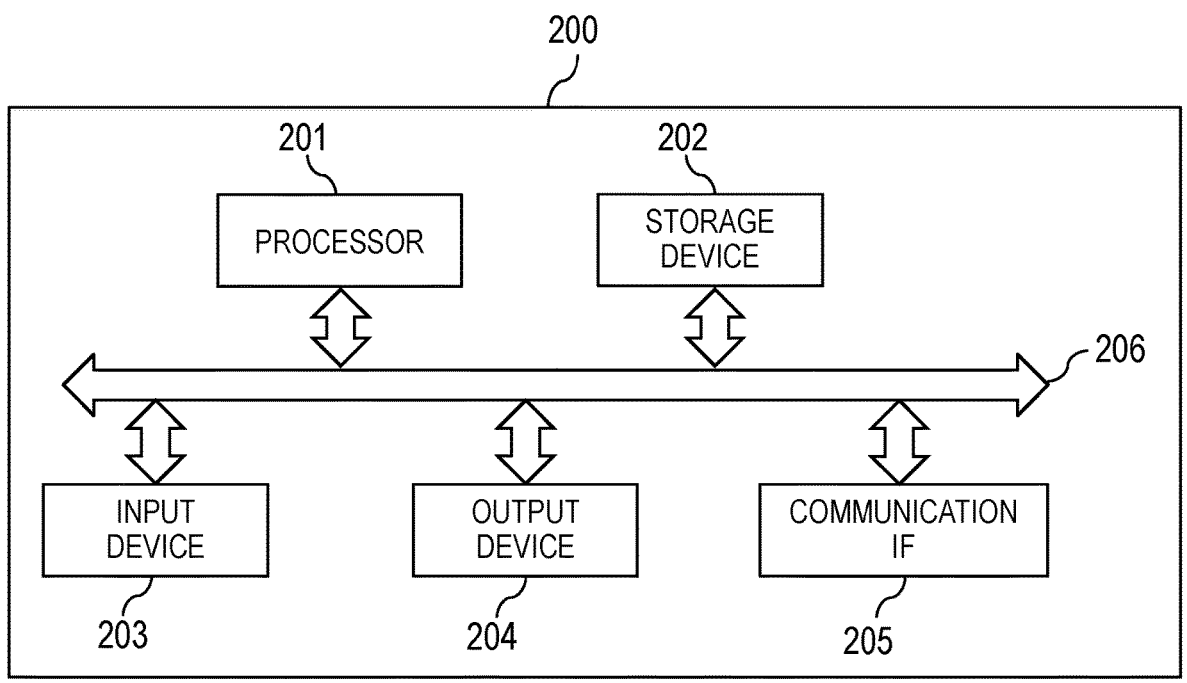
FIG. 2 is a block diagram for illustrating a hardware configuration example of each of computers.

FIG. 2 is a block diagram for illustrating a hardware configuration example of each of computers (the management server 101 and the data center DC). A computer 200 includes a processor 201, a storage device 202, an input device 203, an output device 204, and a communication interface (communication IF) 205. The processor 201, the storage device 202, the input device 203, the output device 204, and the communication IF 205 are coupled to one another through a bus 206. The processor 201 is configured to control the computer 200. The storage device 202 serves as a work area for the processor 201. The storage device 202 is also a non-transitory or transitory recording medium configured to store various programs and various kinds of data. Examples of the storage device 202 include a read only memory (ROM), a random-access memory (RAM), a hard disk drive (HDD), and a flash memory. The input device 203 is configured to input data. Examples of the input device 203 include a keyboard, a mouse, a touch panel, a numeric keypad, a scanner and a sensor. The output device 204 is configured to output data. Examples of the output device 204 include a display, a printer, and a speaker. The communication IF 205 is coupled to the network 110, and is configured to transmit and receive data.

The inter-data center usage configuration setting management unit 111, the hybrid cloud cost presentation unit 112, and the hybrid cloud cost prediction unit 113 are specifically functions realized by the processor 201 executing programs stored in the storage device 202, for example. The configuration management table 121, the performance/capacity history table 122, the cost management table 123, the cost calculation rule table 124, the improvement proposal table 125, and the policy table 126 are specifically realized as data tables stored in the storage device 202.

<Table Configuration Example>

Figure 3:
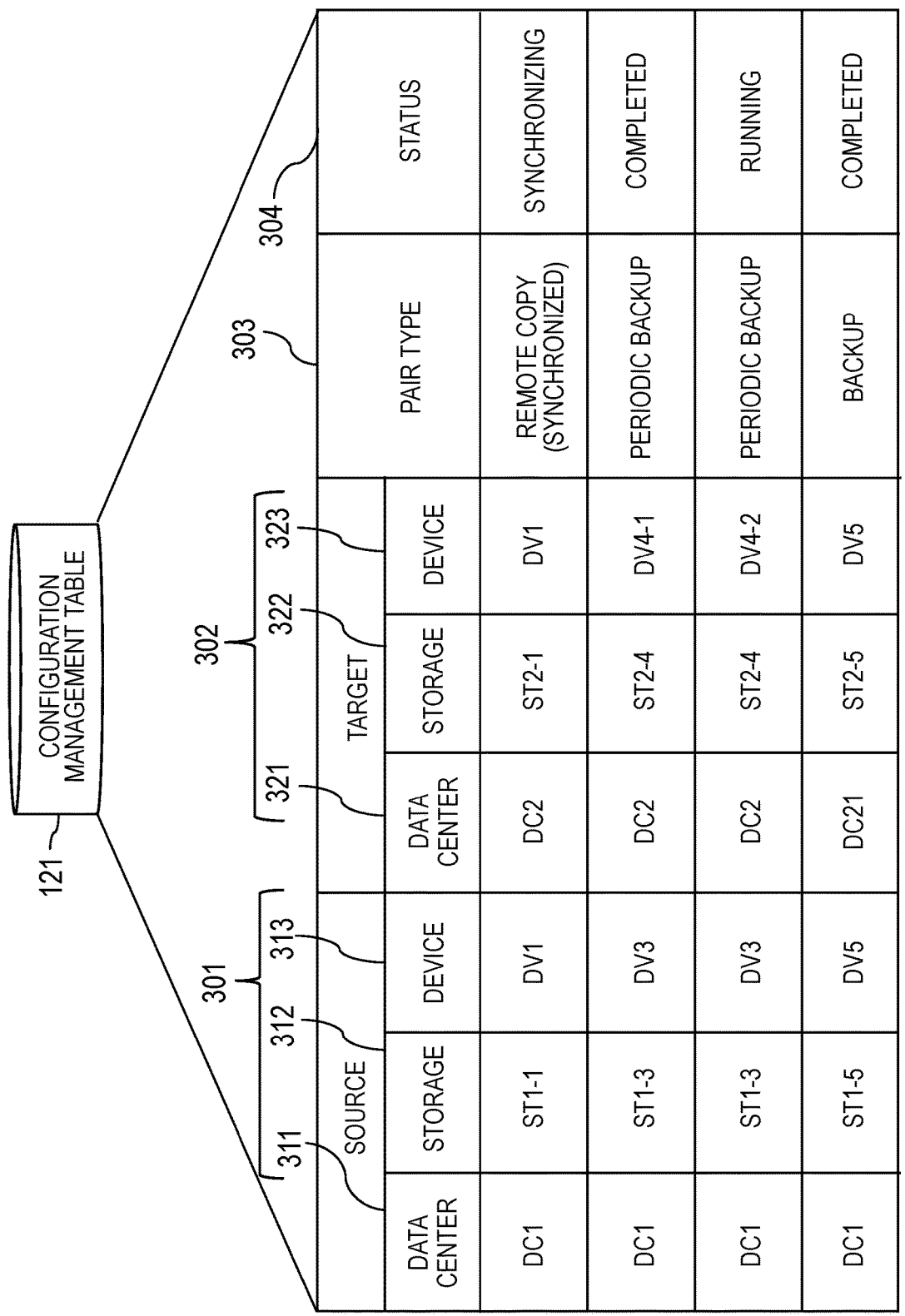
FIG. 3 is a descriptive view showing an example of the configuration management table.

FIG. 3 is a descriptive view showing an example of the configuration management table 121. The configuration management table 121 has, as fields, a source 301, a target 302, a pair type 303, and a status 304.

The source 301 is information defining the transmission source of the data, and has, as subfields, a data center 311, a storage 312, and a device 313. The data center 311 is the data center DC that is the transmission source of the data or identification information that identifies the data center DC. The storage 312 is the storage ST in the storage group STs in the data center DC that is the transmission source of the data or identification information that identifies the storage ST. The device 313 is a device DV that is a volume (data storage region) prepared for each user or each used application in the storage ST identified by the storage 312, or identification information that identifies the device DV.

The target 302 is information defining the transmission destination of the data, and has, as subfields, a data center 321, a storage 322, and a device 323. The data center 321 is the data center DC that is the transmission destination of the data or identification information that identifies the data center DC. The storage 322 is the storage ST in the storage group STs in the data center DC that is the transmission destination of the data or identification information that identifies the storage ST.

The device 323 is the device DV1, DV4-1, DV4-2, DV5, or the like (simply referred to as the "devices DV" if not distinguishing therebetween), or identification information identifying the devices DV.

The storages 312 and 322 may include the type of the storage ST (solid-state drive (SSD), hard disk drive (HDD), etc.). Also, the storage 322 may be a service type of a public cloud such as "storage service 1," or may be details of the service type of the public cloud (the quality level of the service).

The pair type 303 indicates the type of usage configuration of a pair, which is a combination of the source 301 and the target 302 created by a management operation by an operator of the management server 101. "Remote copy (synchronized)" is an operation of causing the data of the source 301 to completely match the data of the target 302. In other words, this indicates successful writing to the source 301 after successful writing to the target 302.

The status 304 indicates the status of the usage configuration of the pair including the source 301 and the target 302. The status 304 being "synchronized" indicates a state in which writing to the source 301 has succeeded after successful writing to the target 302.

FIG. 4 is a descriptive view showing an example of the performance/capacity history table 122. The performance/capacity history table 122 has, as fields, an acquisition date/time 401, a relevant node 402, an observation item 403, and an observation value 404.

The acquisition date/time 401 is the date and time at which the relevant node 402 of the entry acquired the observation value 404 of the observation item 403. The relevant node 402 is identification information that identifies the observation source of the observation value 404. The relevant node 402 has, as subfields, a data center 411, a storage 412, and a device 413. The data center 411 is the data center DC that constitutes the relevant node 402 or identification information that identifies the data center DC. The storage 412 is the storage ST in the storage group STs in the data center DC that constitutes the relevant node 402 or identification information that identifies the storage ST. The device 413 is a device DV of the storage 412 constituting the relevant node 402, or identification information that identifies the device DV.

The observation item 403 is an item of the observation value 404 observed from the device 413, or in other words, a performance index. The observation item 403 includes the capacity of the device 413 or the writing speed ("write IOPS"). The observation value 404 is the observed value for the observation item 403.

Figure 6:
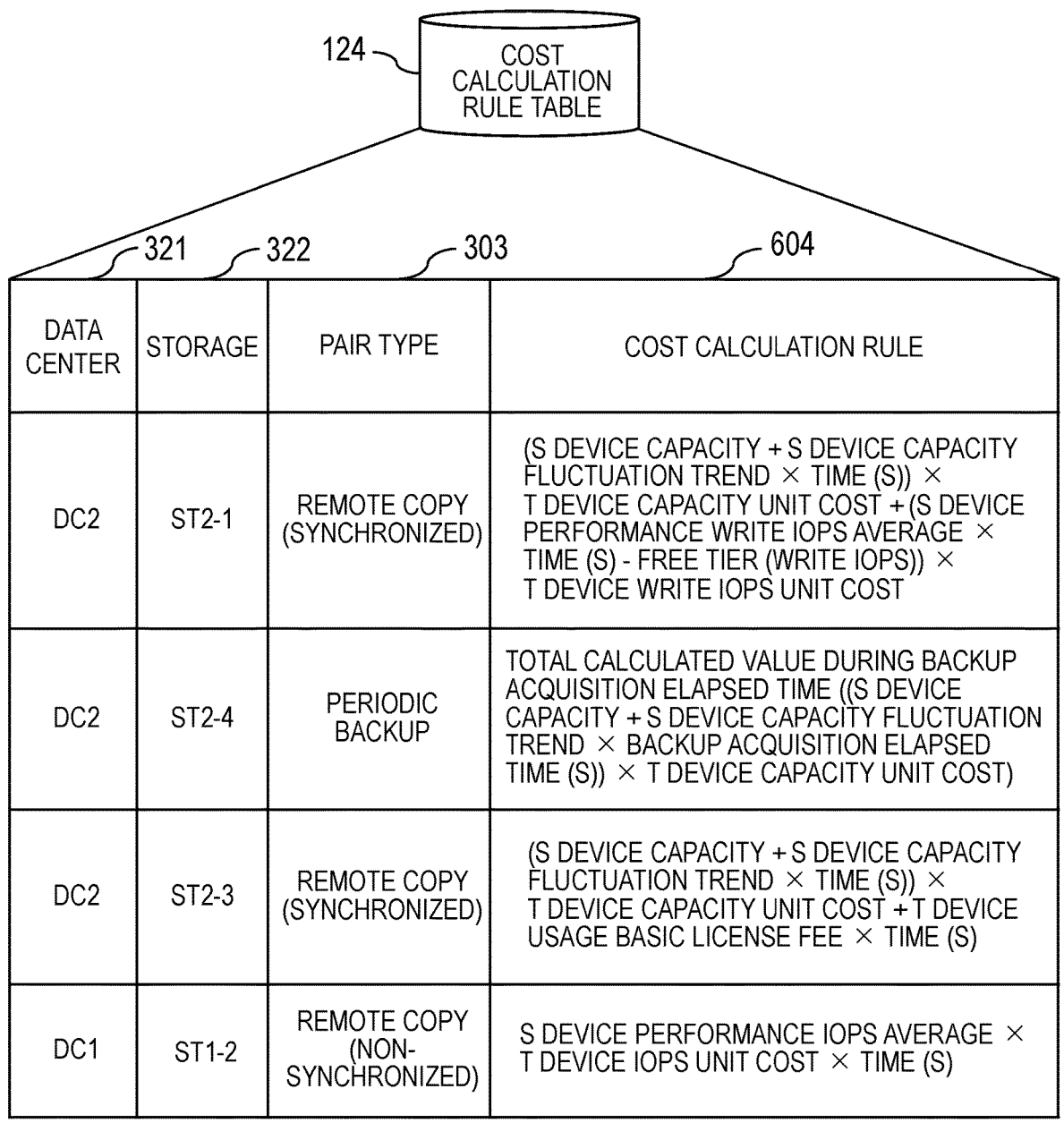
FIG. 6 is a descriptive view showing an example of the cost calculation rule table.

The information stored in the performance/capacity history table 122 is information that can be inputted to a cost calculation formula of a cost calculation rule 604 of the cost calculation rule table 124 (FIG. 6). If an item including the acquisition time length is included in the cost calculation formula, for example, then the difference between two acquisition dates/times 401 can be substituted into the cost calculation formula as the acquisition time length. Also, if specific conditions are satisfied according to the types of the storage 412 and the device 413 in the cost calculation formula, then if a free tier is applied, the storage 412 and the device 413 can be applied to the cost calculation formula. Additionally, if an item including the observation item 403 is included in the cost calculation formula, then the observation value 404 of the observation item 403 can be substituted into the cost calculation formula.

FIG. 5 is a descriptive view showing an example of the cost management table 123. The cost management table 123 is a table for managing a performance value for each service executed in the data center DC. The cost management table 123 has, as fields, a date 501, a data center 502, a service 503, a service instance 504, and a service cost 505.

The date 501 is the date at which the service was executed in the data center DC. The data center 502 is the data center DC that executed the service.

The service 503 is a software function provided by the data center 502. The service instance 504 is an instance of the service 503 provided by the data center 502. The service cost 505 is the cost for the service 503, and more specifically, the unit cost per capacity of the storage ST used in the service 503, for example.

FIG. 6 is a descriptive view showing an example of the cost calculation rule table 124. The cost calculation rule table 124 has, as fields, the data center 321, the storage 322, the pair type 303, and the cost calculation rule 604. The combination of values in the fields of each row constitutes an entry defining each cost calculation rule. The entries may be recorded for each piece of information such as each of the provision regions that differ in cost.

The cost calculation rule 604 is a rule set in advance for calculating the service cost 505, and is defined by a cost calculation formula for calculating the cost. In the cost calculation rule 604, the "S device" indicates the device 313 of the source 301, and the "T device" indicates the device 323 of the target 302.

The "device capacity fluctuation trend" is the amount of change in capacity of the device DV per unit time (per minute). Specifically, for example, the "device capacity fluctuation trend" is a value attained dividing, by the difference in acquisition dates/times 401, the difference between observation values 404 of the differing acquisition dates/times 401, among entries in the performance/capacity history table 122, of the same relevant node 402 and where the observation item 403 is "capacity."

For example, the first row entry and the third row entry are of the same relevant node 402 and both have "capacity" as the observation item 403. Thus, the difference between the observation values 404 is 1 GB (101 GB-100 GB), and the difference in acquisition dates/times 401 is five minutes ("2022/05/18/13:35"-"2022/05/18/13:30"). Therefore, where the observation item 403 is "capacity," the "data center 411 is "DC1," the storage 412 is "ST1-1," and the device 413 is "DV1," the "device capacity fluctuation trend" of the relevant node 402 is 0.2 GB/min (1 G/5 min).

"Time (s)" is a variable for converting the unit time of the "device capacity fluctuation trend" from minutes to seconds.

The "device capacity unit cost" is the unit cost per capacity of the device DV, and is the service cost 505 of the cost management table 123 of FIG. 5. Specifically, the data center DC and the storage ST of the device DV are identified from the configuration management table 121, for example. In the management server 101, the identified data center DC is present in the data center 502, and the fee corresponding to "storage" that is the service 503 is acquired from known usage fee information provided by the cloud vendor as the "device capacity unit cost."

The "device performance/write IOPS average" is an average of the write IOPS that is the performance of the device DV per unit time (per minute). Specifically, for example, in the performance/capacity history table 122, the "device performance/write IOPS average" is the average of observation values 404 with different acquisition dates/times 401 among entries of the same relevant node 402 and where the observation item 403 is "write IOPS."

For example, the second row entry and the fourth row entry are of the same relevant node 402 and both have "write IOPS" as the observation item 403. Thus, the average observation value 404 is 600 ((200+1000)/2). Therefore, where the observation item 403 is "write IOPS," the "data center 411 is "DC1," the storage 412 is "ST1-1," and the device 413 is "DV1," the "device performance/write IOPS average" is "600" for the acquisition time ("2022/05/18/13:30"-"2022/05/18/13:35") of the relevant node 402.

The "free tier (write IOPS)" is a free tier for fees for a case in which the observation item 403 defined for the data center DC such as a public cloud is "write IOPS," and is set in advance in a table (not shown).

The "backup acquisition elapsed time (s)" is an interval of periodic backups (set by the user or default setting), and is set in advance in a table (not shown). If "periodic backup" is selected as the pair type 303, the cost calculation result as calculated according to the cost calculation rule 604 is the sum total for each instance of the periodic backups.

The "usage basic license fee of device" is a license usage fee necessary for using software installed in the storage ST, and is set in advance in a table (not shown).

The "device performance/IOPS average" is an average of the write/read IOPS that is the performance of the device DV per unit time (per minute). The write/read IOPS is a total of the write IOPS and the read IOPS. Specifically, for example, in the performance/capacity history table 122, the "device performance/IOPS average" is the average of observation values 404 with different acquisition dates/times 401 among entries of the same relevant node 402 and where the observation item 403 is "write IOPS" and "read IOPS."

The "IOPS unit cost of device" is the cost per IOPS. In the cost management table 123 of FIG. 5, the service cost 505 per service 503 is defined, and the service cost 505 is shown as an example of the capacity unit cost, but in using the data center DC, and in particular, using the data center in the form of the public cloud service, the IOPS unit cost, the throughput unit cost, and the like are defined, in addition to the capacity unit cost, as more detailed unit costs than those of the service 503. Thus, the "device capacity unit cost" is similarly specified.

Figure 7:
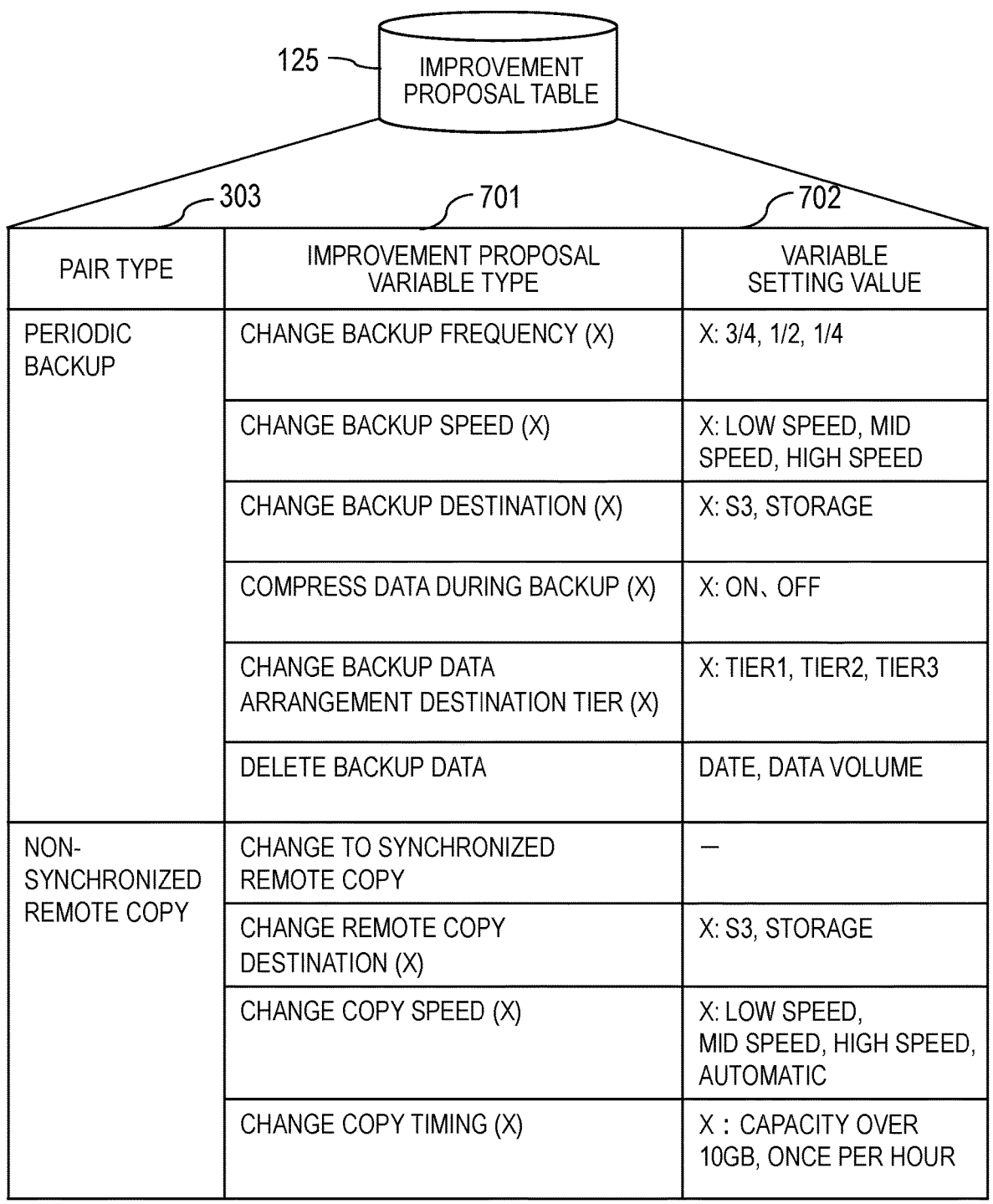
FIG. 7 is a descriptive view showing an example of the improvement proposal table.

FIG. 7 is a descriptive view showing an example of the improvement proposal table 125. The improvement proposal table 125 has, as fields, a pair type 303, an improvement proposal variable type 701, and a variable setting value 702.

The improvement proposal variable type 701 is a proposal indicating measures to reduce cost. The variable setting value 702 is a value set to a variable included in the improvement proposal variable type 701. Specifically, for example, the variable setting value 702 is a value set to a variable included in the cost calculation formula specified by the pair type 303 corresponding to the improvement proposal variable type 701.

Figures 8, 9:
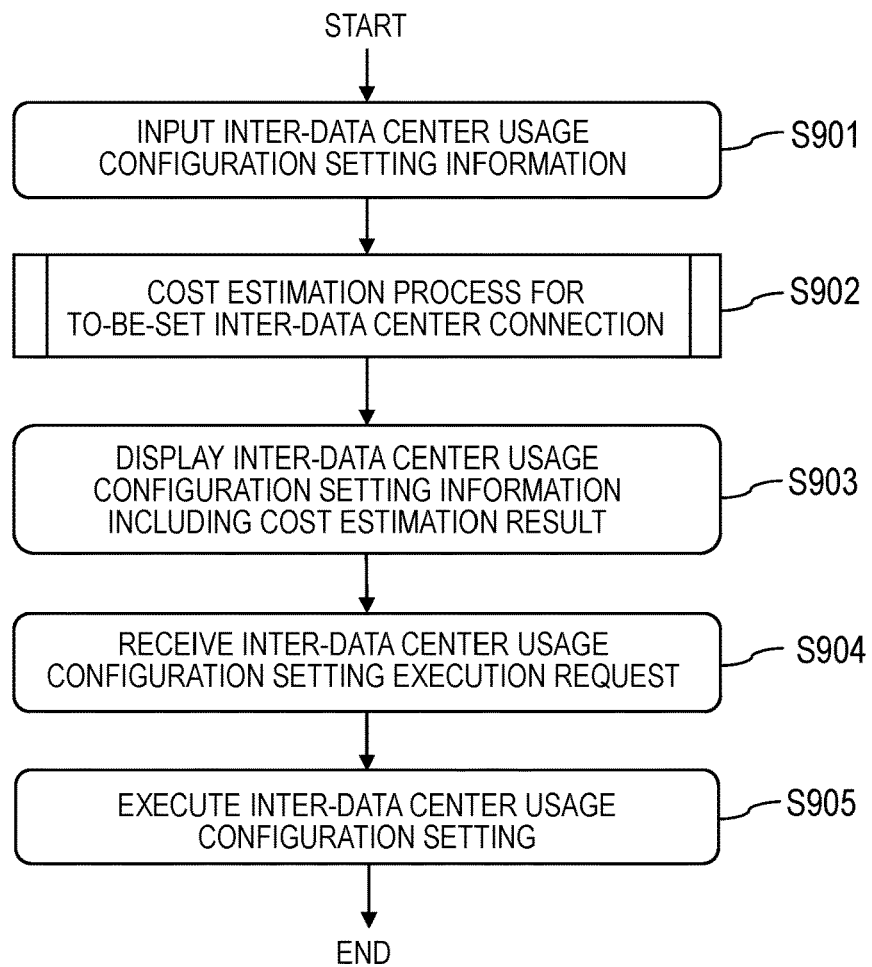
FIG. 8 is a descriptive view showing an example of the policy table.
FIG. 9 is a flowchart showing an example of steps of the inter-data center usage configuration setting process steps.

FIG. 8 is a descriptive view showing an example of the policy table 126. The policy table 126 has, as fields, the policy 801 and the condition 802. The policy 801 is the name of an inter-data center usage configuration setting execution policy. The condition 802 is a restriction used in the inter-data center usage configuration setting execution policy specified by the policy 801.

The inter-data center usage configuration setting execution policy is a policy set in advance by the user such as "cost priority" for setting cost as the top consideration for setting a backup, and setting a remote copy with the "recovery time objective (RTO) priority." Specifically, if "cost priority" is set as the policy 801, the management server 101 uses the inter-data center usage configuration setting management unit 111 in order to execute an inter-data center usage configuration setting process (to be described later with reference to FIG. 9) for a configuration of the target 302 (combination of data center 321, storage 322, pair type 303) with the lowest service cost 505.

If "cost restriction" is set as the policy 801, the management server 101 uses the inter-data center usage configuration setting management unit 111 in order to execute an inter-data center usage configuration setting process such that the monthly backup cost satisfies the condition of "$10,000/month" or less.

If "performance priority" is set as the policy 801, the management server 101 uses the inter-data center usage configuration setting management unit 111 in order to execute an inter-data center usage configuration setting process for a configuration of the target 302 with the highest performance.

If "RTO restriction" is set as the policy 801, the management server 101 uses the inter-data center usage configuration setting management unit 111 in order to execute an inter-data center usage configuration setting process for a configuration of the target 302 that satisfies "1 h or less" for the recovery time from the occurrence of a malfunction.

<Inter-Data Center Usage Configuration Setting Process>

FIG. 9 is a flowchart showing an example of steps of the inter-data center usage configuration setting process steps. The inter-data center usage configuration setting management unit 111 acquires inter-data center usage configuration setting information (step S901). The inter-data center usage configuration setting information includes the source 301, the target 302, and the start date/time. Specifically, for example, the inter-data center usage configuration setting management unit 111 displays the configuration management table 121, receives from the input device 203 selection of the inter-data center usage configuration setting information that is an entry of the configuration management table 121, and also receives the start date/time.

The inter-data center usage configuration setting management unit 111 may also receive input of the configuration of the target 302 (combination of data center 321, storage 322, pair type 303) designating the cost calculation rule 604 as the inter-data center usage configuration setting information. The inter-data center usage configuration setting information may also include information such as the maximum transfer speed (speed limit) if the pair type 303 is "remote copy," the backup acquisition interval, the backup storage time, and the number of times that the backup is stored (how many instances of backups to keep) if the pair type 303 is "periodic backup," whether to also transfer to the target 302 the backup data (snapshot) acquired from within the storage 312 of the source 301, or the presence or absence of a cost estimate request.

The inter-data center usage configuration setting management unit 111 may automatically execute a setting operation for the inter-data center usage configuration setting information. If there is only one setting operation, then there is a case in which there is one configuration of the target 302 that can be acquired (combination of data center 321, storage 322, pair type 303), or a case in which one unique target 302 is determined from among a configuration of a plurality of the targets 302 according to the inter-data center usage configuration setting execution policy. In the case of the latter, a configuration that satisfies the inter-data center usage configuration setting execution policy is set.

Also, if a condition that is based on a fixed value such as the monthly backup cost per unit of data being 100,000 yen or less is set, then the inter-data center usage configuration setting for a configuration of the target 302 that satisfies this condition is selected and displayed. If, aside from cost prioritization, an inter-data center usage configuration setting execution policy that prioritizes RTO or performance or a more complex condition is set, then by using this condition in combination with an estimation process according to a conventional technique, it is possible to set inter-data center usage configuration setting information based on the inter-data center usage configuration setting execution policy.

Next, the hybrid cloud cost prediction unit 113 executes a cost estimation process for a to-be-set inter-data center usage configuration (step S902). As a result of the cost estimation process for the to-be-set inter-data center usage configuration (step S902), a cost estimate result is generated. Details regarding the cost estimation process for the to-be-set inter-data center usage configuration (step S902) will be described later with reference to FIG. 10.

Figure 14:
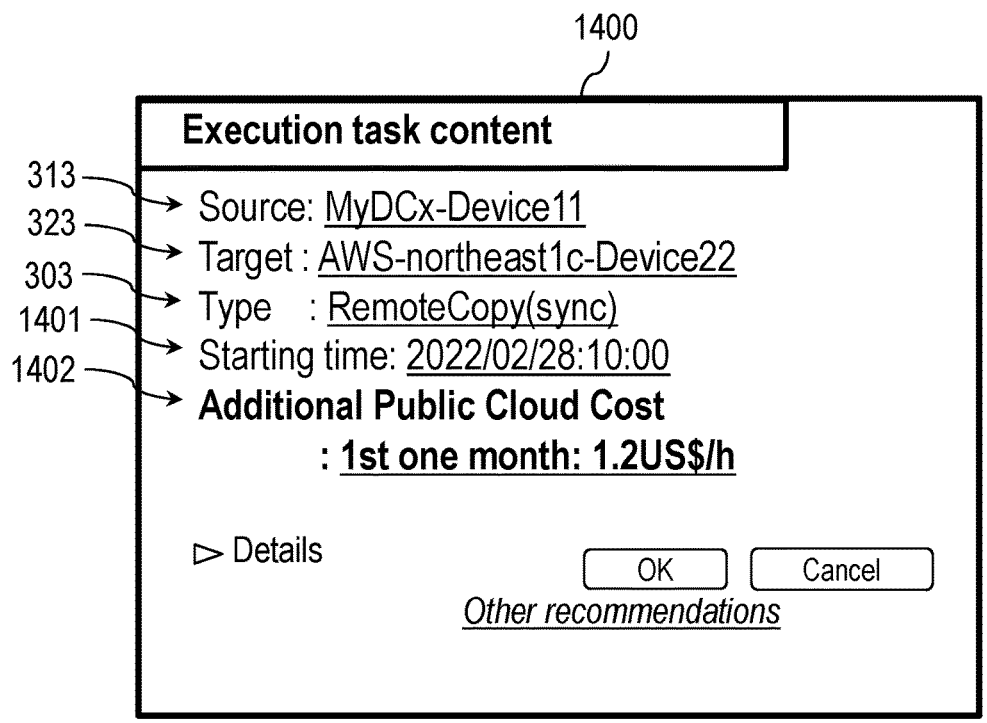
FIG. 14 is a descriptive drawing showing an example of a cost estimate result display screen.

After step S902, the inter-data center usage configuration setting management unit 111 displays inter-data center usage configuration setting information including the result of cost estimation (step S903) (see FIG. 14).

Next, the inter-data center usage configuration setting management unit 111 receives an inter-data center usage configuration setting execution request from the input device 203 (step S904). Upon receiving the inter-data center usage configuration setting execution request, the inter-data center usage configuration setting management unit 111 executes the inter-data center usage configuration setting (step S905). Upon completion of execution of the inter-data center usage configuration setting, the inter-data center usage configuration setting process ends.

<Cost Estimation Process for to-be-Set Inter-Data Center Usage Configuration (Step S902)>

Figure 10:
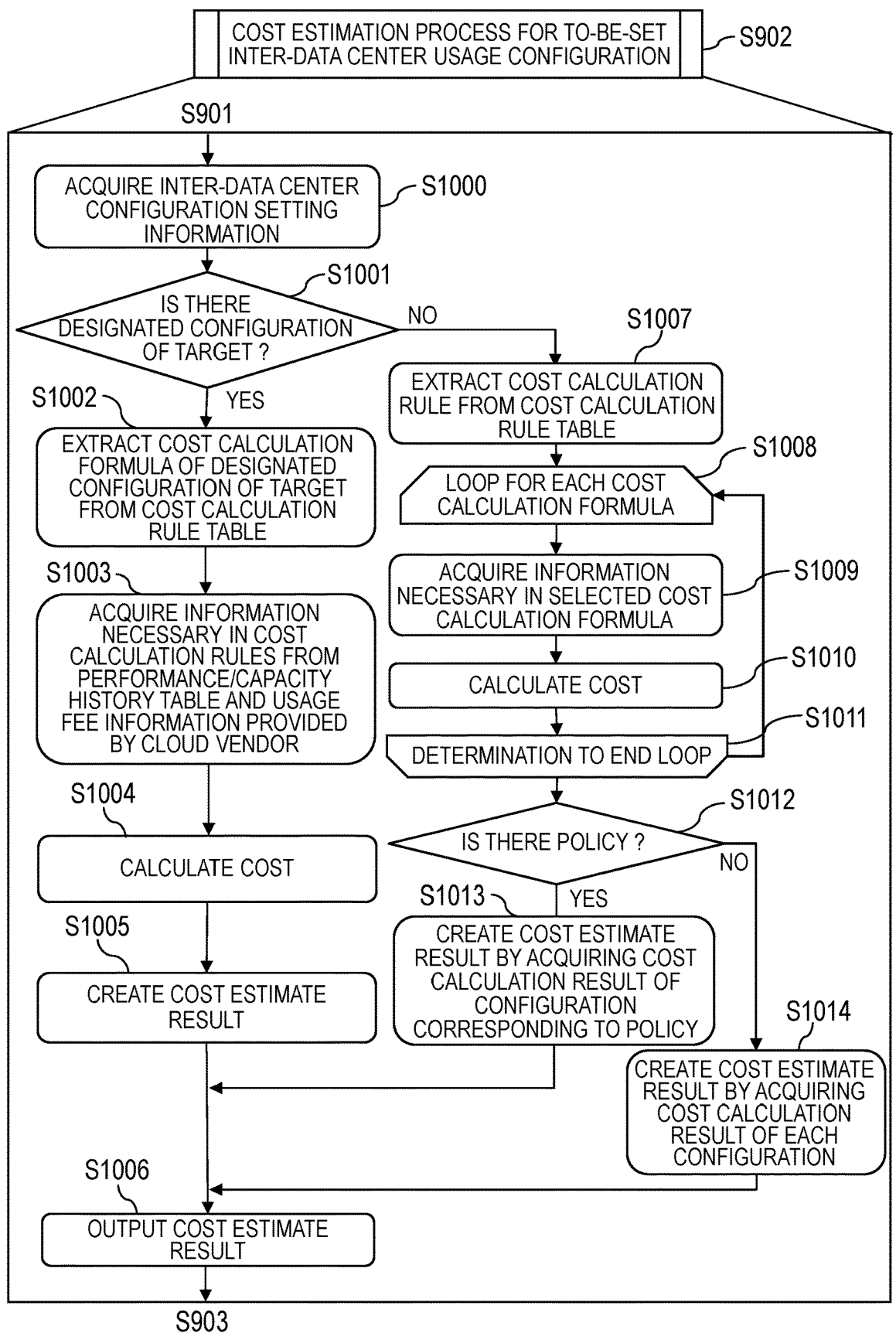
FIG. 10 is a flowchart showing an example of detailed process steps of the cost estimation process for the to-be-set inter-data center usage configuration (step S902).

FIG. 10 is a flowchart showing an example of detailed process steps of the cost estimation process for the to-be-set inter-data center usage configuration (step S902). The hybrid cloud cost prediction unit 113 acquires the inter-data center usage configuration setting information (source 301, target 302, start date/time) from the inter-data center usage configuration setting management unit 111 (step S1000). If the inter-data center usage configuration setting information does not include the configuration of the target 302 (combination of data center 321, storage 322, pair type 303) designating the cost calculation rule 604, then the inter-data center usage configuration setting management unit 111 may set a configuration of the target 302 satisfying the inter-data center usage configuration setting execution policy as described above.

Next, the inter-data center usage configuration setting management unit 111 determines whether designation of the configuration of the target 302 (combination of data center 321, storage 322, pair type 303) is included in the inter-data center usage configuration setting information (step S1001).

If the configuration of the target 302 (combination of data center 321, storage 322, pair type 303) is present (step S1001: Yes), then the inter-data center usage configuration setting management unit 111 extracts a cost calculation formula corresponding to the designated configuration of the target 302 (combination of data center 321, storage 322, pair type 303) from the cost calculation rule 604 of the cost calculation rule table 124 (FIG. 6) (step S1002).

Then, the inter-data center usage configuration setting management unit 111 acquires information necessary in the cost calculation formula from the performance/capacity history table 122 (FIG. 4) and the usage fee information provided by the cloud vendor (step S1003). The usage fee information provided by the cloud vendor is fee information determined for each cloud resource, and is, for example, the usage unit cost per hour of a computer resource, the capacity unit cost of a storage region, the basic license fee for function usage, free tier information for usage, and the like. The usage fee information provided by the cloud vendor is stored in a table (not shown).

Next, the inter-data center usage configuration setting management unit 111 executes cost calculation by substituting the information acquired in step S1004 into the extracted cost calculation formula to output the cost calculation result (step S1004).

Next, the inter-data center usage configuration setting management unit 111 creates a cost estimate result that includes the cost calculated in step S1004, the designated configuration of the target 302 (combination of data center 321, storage 322, pair type 303), and the source 301 (step S1005).

Then, the inter-data center usage configuration setting management unit 111 outputs the cost estimate result (step S1006). As a result, the cost estimation process for the to-be-set inter-data center usage configuration (step S902) ends, and the process progresses to step S903.

On the other hand, in step S1001, if there is no cost estimation request in the designation of the configuration of the target 302 (step S1001: No), then the inter-data center usage configuration setting management unit 111 extracts the cost calculation rule 604 from the cost calculation rule table 124 (step S1007).

Then, the inter-data center usage configuration setting management unit 111 selects an unselected cost calculation formula from the cost calculation rule 604 (step S1008). Similar to step S1004, the inter-data center usage configuration setting management unit 111 acquires information necessary in the selected cost calculation formula from the performance/capacity history table 122 (FIG. 4) and the usage fee information provided by the cloud vendor (step S1009).

Next, the inter-data center usage configuration setting management unit 111 substitutes the information acquired in step S1009 into the cost calculation formula to output the cost calculation result (step S1010). If there is an unselected cost calculation formula, the process returns to step S1008, and if there are no unselected cost calculation formulas, then the loop is ended and the process progresses to step S1012 (step S1011).

Next, the inter-data center usage configuration setting management unit 111 determines whether the inter-data center usage configuration setting execution policy is set (step S1012). If the inter-data center usage configuration setting execution policy is set (step S1012: Yes), the inter-data center usage configuration setting management unit 111 acquires the cost calculation results satisfying the inter-data center usage configuration setting execution policy to create cost estimate results (step S1013), and progresses to step S1006.

If, for example, the policy 801 is "cost restriction," then the condition 802 is "$10,000/month," and thus, if the cost calculated in step S1010 is "$10,000/month," the cost calculated in step S1010, the source 301, and the configuration of the target 302 are relevant to the creation of cost estimate results.

If, aside from cost, a more complex condition is set such as a policy that restricts RTO or prioritizes performance, then by using this condition in combination with an estimation process according to a publicly known technique, it is possible to select an inter-data center usage configuration setting based on the policy. If the policy 801 is "RTO restriction," for example, then the condition 802 is "within 1 h," and thus, the configuration resulting from a synchronized remote copy that can be immediately restored and a non-synchronized remote copy are relevant to creation of cost estimate results, and a periodic backup that results in the time for restoring the system being longer than 1 h is not relevant to the creation of the cost estimate results, or the like.

On the other hand, if the inter-data center usage configuration setting execution policy is not set (step S1012: No), the inter-data center usage configuration setting management unit 111 acquires the cost calculation results of each cost calculation formula to create cost estimate results (step S1014) of the configuration of each target 302 (combination of data center 321, storage 322, pair type 303), and progresses to step S1006.

<Hybrid Cloud Cost Display Process>

Figure 11:
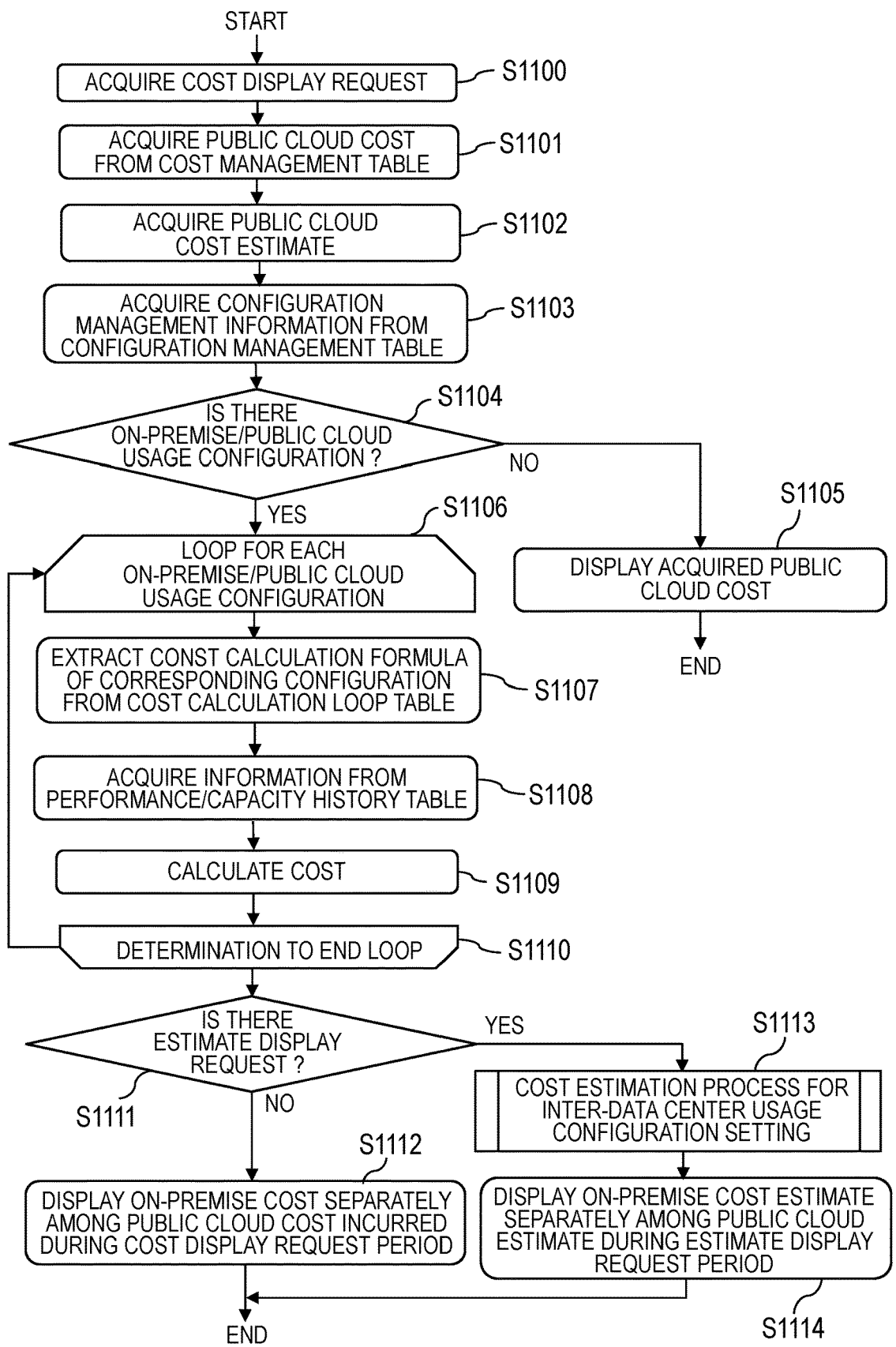
FIG. 11 is a flowchart showing an example of hybrid cloud cost display process steps. The hybrid cloud cost presentation unit acquires a cost display request (step S1100).

FIG. 11 is a flowchart showing an example of hybrid cloud cost display process steps. The hybrid cloud cost presentation unit 112 acquires a cost display request (step S1100). The cost display request includes at least a designation of the date 501, among a group including the date 501, the data center 502, the service 503, and the service instance 504. The designation of the date 501 may be one given date, or a period of multiple consecutive dates (e.g., a week or a month). The date 501 may be set to a default date. Below, the date is referred to as a cost display request period.

Upon acquiring the cost display request, the hybrid cloud cost presentation unit 112 acquires a public cloud cost from the cost management table 123 (FIG. 5) (step S1101). The public cloud cost is the date 501, the data center 502, the service 503, the service instance 504, and the service cost 505 corresponding to the cost display request.

The hybrid cloud cost presentation unit 112 acquires a public cloud cost estimate using the public cloud cost acquired in step S1101 (step S1102). Specifically, the public cloud cost estimate is, for example, the average value (statistical value) of the total service cost 505 per day, attained by dividing the total service cost 505 of the public cloud cost by a period designated by the date 501 included in the cost display request.

Upon acquiring the cost display request, the hybrid cloud cost presentation unit 112 acquires configuration management information from the configuration management table 121 (FIG. 3) (step S1103). The configuration management information includes the source 301, the target 302, the pair type 303, and the status 304. The hybrid cloud cost presentation unit 112 acquires configuration management information in which the data center 502 in the public cloud cost information corresponds to either of the data center 311 of the source 301 or the data center 321 of the target 302.

The hybrid cloud cost presentation unit 112 determines whether an on-premise/public cloud usage configuration is present (step S1104). The on-premise/public cloud usage configuration is configuration management information, among the configuration management information acquired in step S1102, where the data center 311 is an on-premise system and the data center 321 is a public cloud, or the data center 311 is a public cloud and the data center 321 is an on-premise system.

A configuration that is not the on-premise/public cloud usage configuration is configuration management information, among the configuration management information acquired in step S1102, where both the data center 311 and the data center 321 are on-premise systems, or both the data center 311 and the data center 321 are public clouds.

If there is no on-premise/public cloud usage configuration (step S1105: No), then the hybrid cloud cost presentation unit 112 outputs the public cloud cost information acquired in step S1102 in a manner enabling display thereof (step S1105).

On the other hand, if the on-premise/public cloud usage configuration is present (step S1104: Yes), the hybrid cloud cost presentation unit 112 selects an on-premise/public cloud usage configuration that has yet to be selected (step S1106).

The hybrid cloud cost presentation unit 112 extracts, from the cost calculation rules 604 (FIG. 6) of the cost calculation rule table 124, the cost calculation formula of the configuration of the target 302 (data center 321, storage 322, pair type 303) matching the data center 321, the storage 322, and the pair type 303 of the target 302 of the selected on-premise/public cloud usage configuration (configuration management information) (step S1107).

The hybrid cloud cost presentation unit 112 acquires information necessary for the cost calculation formula extracted in step S1107 from the performance/capacity history table 122 (step S1108).

The hybrid cloud cost presentation unit 112 substitutes, into the cost calculation formula extracted in step S1107, the information acquired in step S1108, to calculate the cost that is a performance value (step S1109). If there is an unselected cost calculation formula, the process returns to step S1106, and if there are no unselected cost calculation formulas, then the loop is ended and the process progresses to step S1111 (step S1110).

The hybrid cloud cost presentation unit 112 awaits input of an estimate display request (step S1111). The estimate display request includes an estimate display request period. If there is no estimate display request (step S1111: No), then the on-premise cost among the public cloud cost in the acquired cost display request period is displayed separately (step S1112) (see FIG. 15). The on-premise cost is the cost (performance value) calculated in step S1109. Specifically, the on-premise cost is, for example, the cost (performance value) of the public cloud accrued for data transferred to the public cloud according to a request to the on-premise system if there is a setting between the on-premise system and the public cloud.

On the other hand, if there is an estimate display request (step S1111: Yes), the hybrid cloud cost presentation unit 112 executes a cost estimation process (step S1113) for the inter-data center usage configuration setting (described later with reference to FIG. 12).

Figure 16:
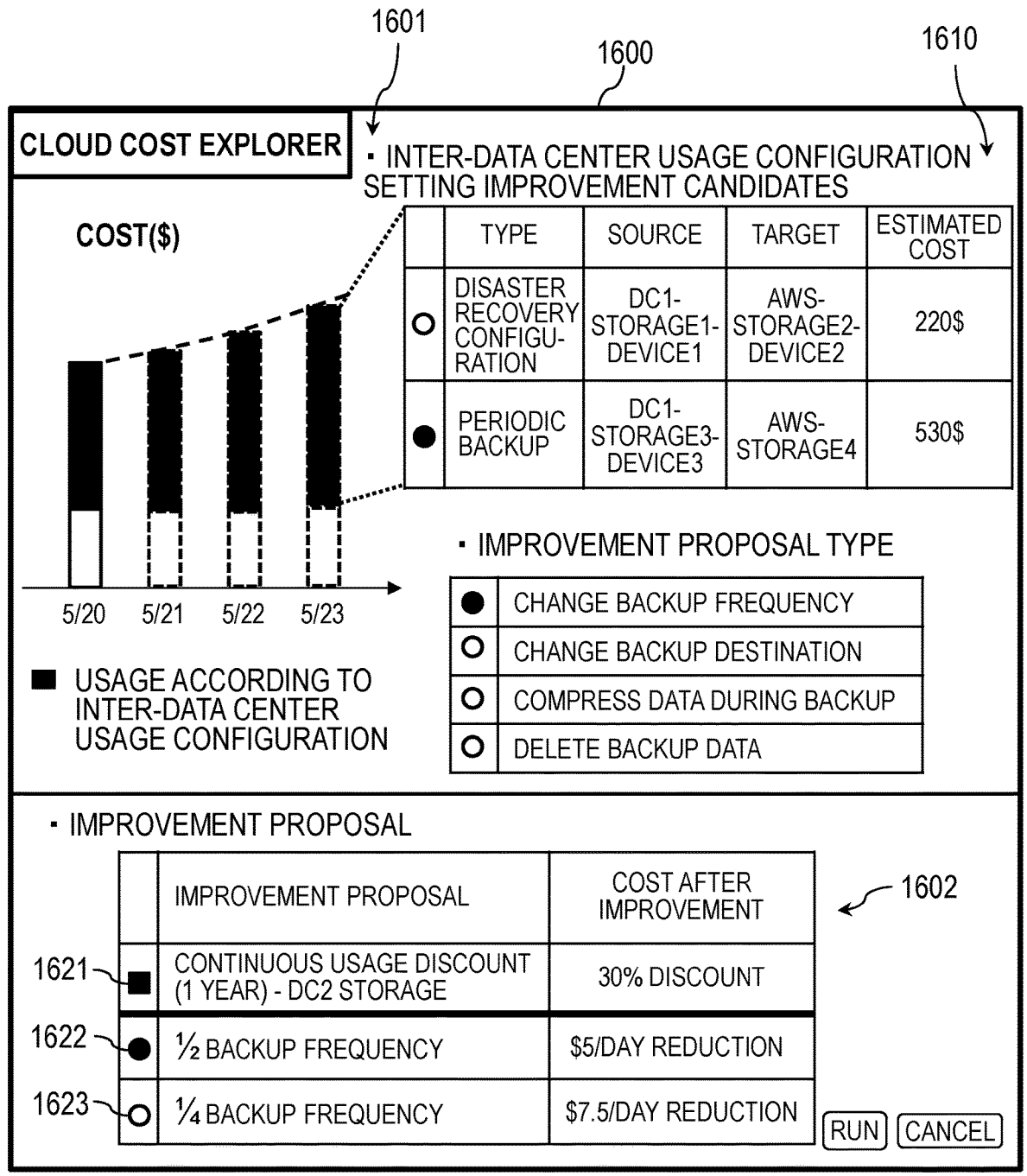
FIG. 16 is a descriptive drawing showing an example of a cost estimate screen.

The hybrid cloud cost presentation unit 112 displays separately the on-premise cost estimate among the public cloud cost estimate in the acquired estimate display request period acquired in step S1102 (step S1114) (see FIG. 16). As a result, the hybrid cloud cost display process ends.

The cost of the public cloud and the cost of the public cloud incurred as a result of the configuration that connects the on-premise system to the public cloud were described, but the on-premise system cost may be displayed together in the case of an environment in which the on-premise system environment is an environment in which the cost is determined by pay-per-use of capacity or the like as opposed to an environment in which the device is purchased outright. The cost of an on-premise system can be calculated on the basis of agreement information (billing method, unit cost information) between the user and the on-premise environment provider, and the usage state of the on-premise system (performance/capacity history table 122).

<Cost Estimation Process for Inter-Data Center Usage Configuration Setting (Step S1113)>

Figure 12:
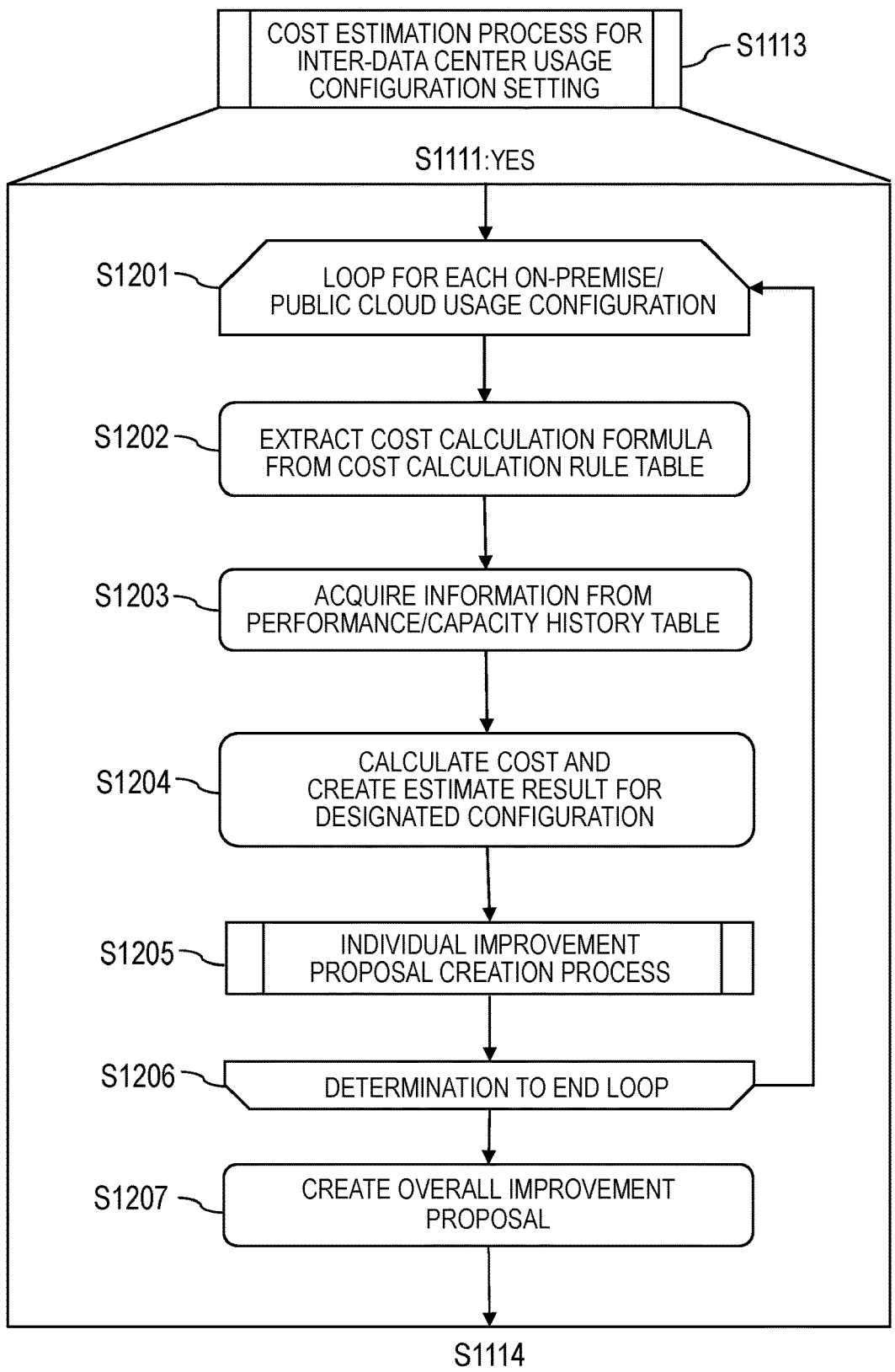
FIG. 12 is a flowchart showing an example of detailed process steps of the cost estimation process for the inter-data center usage configuration setting (step S1113).

FIG. 12 is a flowchart showing an example of detailed process steps of the cost estimation process for the inter-data center usage configuration setting (step S1113). The cost estimation process for the inter-data center usage configuration setting (step S1113) is a process for calculating the cost estimate on the basis of past performance/capacity history. The hybrid cloud cost presentation unit 112 selects an on-premise/public cloud usage configuration (configuration management information) that has yet to be selected (step S1201).

The hybrid cloud cost presentation unit 112 extracts, from the cost calculation rules 604 (FIG. 6) of the cost calculation rule table 124, the cost calculation formula of the configuration of the target 302 (data center 321, storage 322, pair type 303) matching the data center 321, the storage 322, and the pair type 303 of the target 302 of the on-premise/public cloud usage configuration (configuration management information) selected in step S1201 (step S1202).

The hybrid cloud cost presentation unit 112 acquires information necessary for the cost calculation formula extracted in step S1202 from the performance/capacity history table 122 (step S1203). The hybrid cloud cost presentation unit 112 substitutes, into the cost calculation formula extracted in step S1202, the information acquired in step S1203, to calculate the cost that is an estimate value, and creates estimate results of the selected on-premise/public cloud usage configuration (configuration management information) (step S1204).

The hybrid cloud cost presentation unit 112 executes an individual improvement proposal creation process (step S1205) (described later with reference to FIG. 12). If there is an unselected on-premise/public cloud usage configuration (configuration management information), the process returns to step S1201, and if there are no unselected on-premise/public cloud usage configurations (configuration management information), then the loop is ended and the process progresses to step S1207 (step S1206).

The hybrid cloud cost presentation unit 112 uses individual improvement proposals for each on-premise/public cloud usage configuration (configuration management information) to create an overall improvement proposal (step S1207). The overall improvement proposal indicates an improvement proposal that can be taken in a public cloud by which, for example, the public cloud can be used at a discounted rate under the condition of continual use of a certain amount of resources or more, rather than individual settings. At this time, by clarifying the resource use amount attributable to the on-premise/public cloud configuration, it is possible to determine, with ease, whether continual use will continue in the future. If a synchronized remote copy is being executed, use will continue, and thus, it is possible to set a discount for such use. Then, the cost estimation process for the inter-data center usage configuration setting (step S1113) ends, and the process progresses to step S1114.

<Individual Improvement Proposal Creation Process (Step S1205)>

Figure 13:
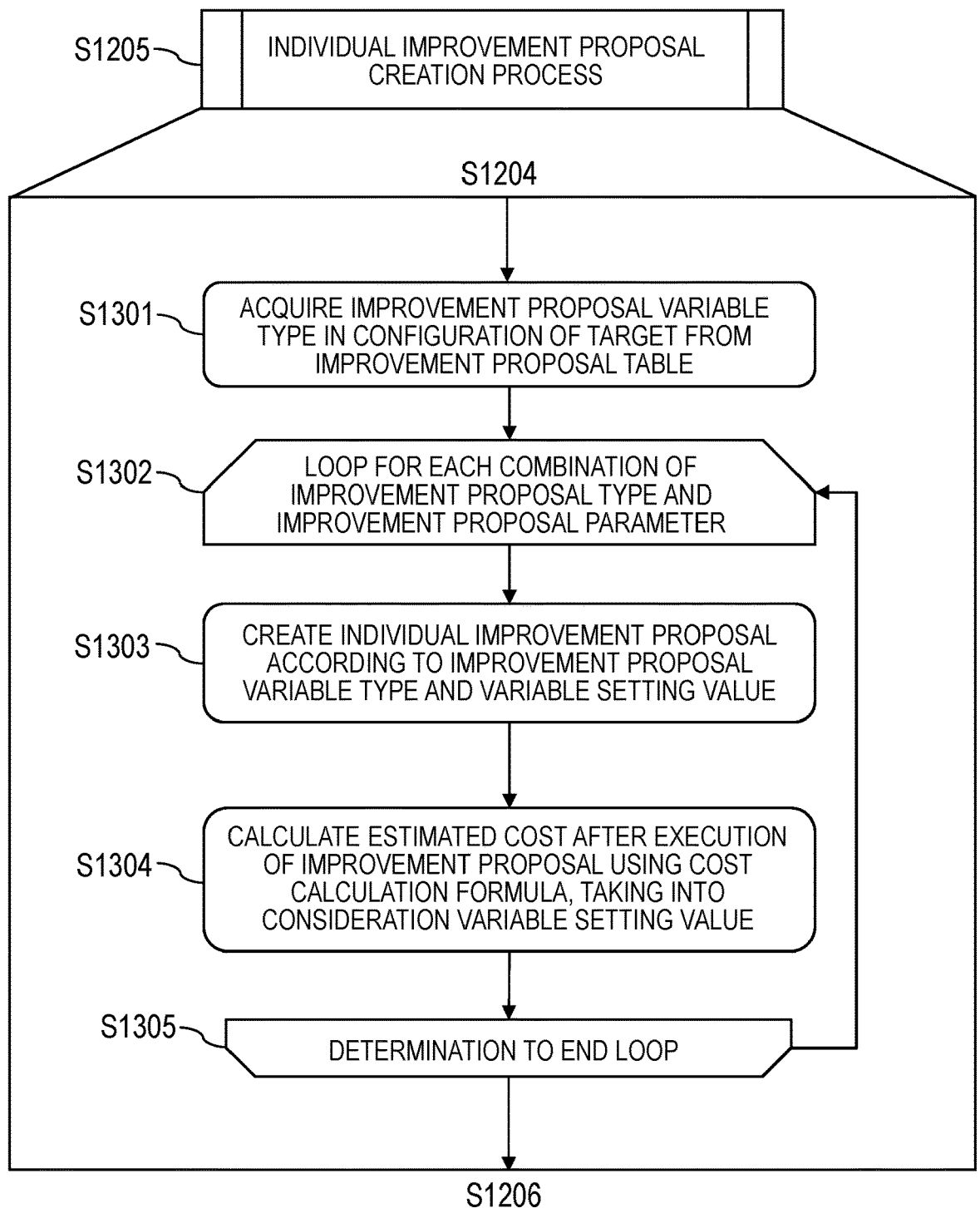
FIG. 13 is a flowchart showing an example of detailed process steps of the individual improvement proposal creation process (step S1205) shown in FIG. 12.

FIG. 13 is a flowchart showing an example of detailed process steps of the individual improvement proposal creation process (step S1205) shown in FIG. 12. The hybrid cloud cost presentation unit 112 acquires, from the improvement proposal table 125, an improvement proposal variable type 701 in an entry of a pair type 303 that matches the pair type 303 in the configuration of the target 302 (data center 321, storage 322, pair type 303) in the on-premise/public cloud usage configuration (configuration management information) selected in step S1201 (step S1301).

The hybrid cloud cost presentation unit 112 selects a combination of an unselected improvement proposal variable type 701 and the variable setting value 702 thereof among the improvement proposal variable types 701 acquired in step S1301 (step S1302). The hybrid cloud cost presentation unit 112 creates an individual improvement proposal according to the combination of the selected improvement proposal variable type 701 and the variable setting value 702 (step S1303).

In doing so, the hybrid cloud cost presentation unit 112 extracts a cost calculation formula from the cost calculation rule 604 corresponding to the pair type 303 matching the improvement proposal variable type 701. If there is no term restricting the variable setting value 702 in the extracted cost calculation formula, the hybrid cloud cost presentation unit 112 creates an individual improvement proposal that covers all values of the variable (X) of the variable setting value 702 that can be applied to the extracted cost calculation formula.

If the pair type 303 is "periodic backup" and the improvement proposal variable type 701 that can be applied to the extracted cost calculation formula is "change backup frequency (X)" and "change backup speed (X)," for example, then the variable (X) of the variable setting value 702 of "change backup frequency (X)" is "¾," "½," and "¼," and the variable (X) of the variable setting value 702 of "change backup speed (X)" is "low speed," "mid speed," and "high speed." In this case, nine different individual improvement proposals are created.

On the other hand, if there is a term restricting the variable setting value 702 in the extracted cost calculation formula, the hybrid cloud cost presentation unit 112 creates an individual improvement proposal that uses the variable (X) of the variable setting value 702 that can be applied to the extracted cost calculation formula according to a restriction (e.g., the inter-data center usage configuration setting execution policy).

If, similar to what was described above, the pair type 303 is "periodic backup" and the improvement proposal variable type 701 that can be applied to the extracted cost calculation formula is "change backup frequency (X)" and "change backup speed (X)," for example, then if the extracted cost calculation formula has a term to which a free tier is applied where the backup speed is mid speed or less, then the hybrid cloud cost presentation unit 112 applies "mid speed" and "low speed" among the "low speed," "mid speed," and "high speed" that are the variable setting values 702 of "change backup speed (X)" of the improvement proposal variable type 701. In this case, six different individual improvement proposals are created.

Also, if a plurality of storages 322 are present in the data center 321 of the target 302, then the hybrid cloud cost presentation unit 112 may create an individual improvement proposal as described above for each of the plurality of storages 322. Also, if a plurality of devices 323 are present in the storage 322 of the data center 321 of the target 302, then the hybrid cloud cost presentation unit 112 may create an individual improvement proposal as described above for each of the plurality of devices 323.

The hybrid cloud cost presentation unit 112 calculates an estimate cost after execution of the improvement proposal for each of the created individual improvement proposals (step S1304).

If there is an unselected combination of an improvement proposal variable type 701 and a variable setting value 702, the process returns to step S1301, and if there are no unselected combinations of an improvement proposal variable type 701 and a variable setting value 702, then the loop is ended and the process progresses to step S1206 (step S1305).

<Cost Estimate Result Display Screen>

FIG. 14 is a descriptive drawing showing an example of a cost estimate result display screen. The cost estimate result display screen 1400 is a screen displayed in step S903 of FIG. 9. The cost estimate result display screen 1400 displays, as the inter-data center usage configuration setting information, the device 313 of the source 301, the device 323 of the target 302, the pair type 303 and the start date/time 1401 of the pair type 303, and cost estimate results 1402.

The user can confirm that there is no issue with the inputted connective configuration or with the cost estimate results 1402 with reference to the cost estimate result display screen 1400.

<Cost Performance Screen>

Figure 15:
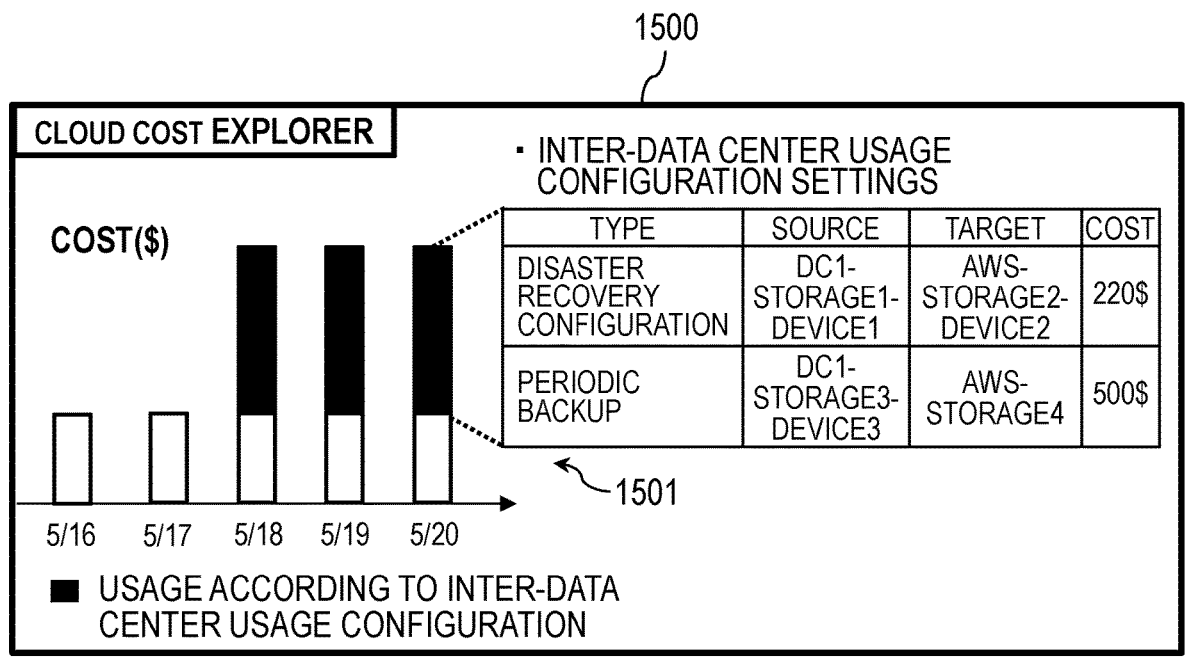
FIG. 15 is a descriptive drawing showing an example of a cost performance screen. The cost performance screen 1500 is a screen displayed in step S1112 of FIG. 11.

FIG. 15 is a descriptive drawing showing an example of a cost performance screen. The cost performance screen 1500 is a screen displayed in step S1112 of FIG. 11. The cost performance screen 1500 displays a graph 1501 indicating the actual usage according to the inter-data center usage configuration setting in relation to the total cost. If there are a plurality of inter-data center usage configuration settings, the costs for each inter-data center usage configuration setting are displayed in a list, but the cost incurred from an on-premise/public cloud configuration, among the public cloud usage, may be displayed separately. Also, a configuration may be adopted in which settings and a screen with details are prepared, and the type of inter-data center usage configuration setting and details of the cost calculation formula are displayed.

Here, an example in which display is performed for each data center connection configuration is shown, but display at the service or function level of a public cloud may be performed. Specifically, a configuration may be adopted in which the usage according to the inter-data center configuration setting among the cost incurred from the storage provision service (TB/h), the usage according to the inter-data center usage configuration setting among the data inflow amount (TB/month), and the like are shown. Also, an example was described in which the performance display and the estimate display are displayed together, but the foregoing may be displayed in separate screens.

<Cost Estimate Screen>

FIG. 16 is a descriptive drawing showing an example of a cost estimate screen. The cost estimate screen 1600 is a screen displayed in step S1114 of FIG. 11. The cost estimate screen 1600 displays a graph 1601 indicating the estimated usage according to the inter-data center usage configuration setting in relation to the total cost. The black portions of the graph 1601 are the estimate results for each usage configuration calculated in step S1204.

Details of the graph 1601 correspond to the rows (black circle radio buttons) selected by radio button among an inter-data center usage configuration setting improvement candidate table 1610. Each row of the inter-data center usage configuration setting improvement candidate table 1610 is a calculation result of step S1204. "Estimated cost" refers to the cost calculated in step S1204.

Also, the cost estimate screen 1600 displays improvement proposal information 1602 indicating the improvement proposal and the post-improvement cost. The entry of the first row of the improvement proposal information 1602 is the overall improvement proposal calculated in step S1207.

Creation of the overall improvement proposal indicates a proposal for a measure that can be taken in a public cloud as an entire system, rather than individual settings, by which the public cloud can be used at a discounted rate under the condition of continual use of a certain amount of resources or more, for example. At this time, by clarifying the resource use amount attributable to the usage configuration, it is possible to determine, with ease, whether continual use will continue in the future. If a synchronized remote copy is being executed, use will continue, and thus, a discount is set for such use. "Continuous Usage Discount (1 year) DC2 Storage" is one example.

The second row and third row entries of the improvement proposal information 1602 are improvement proposals and estimated costs after execution of the improvement proposals (step S1304). The square graphic on the left of the improvement proposal information 1602 is a checkbox 1621. When the row is selected, then as shown in FIG. 16, the checkbox 1621 becomes black, and when the row is not selected, the checkbox 1621 becomes white.

The round graphics on the left of the improvement proposal information 1602 are radio buttons 1622 and 1623, and either one of the individual improvement proposals (created during the individual improvement proposal creation process (step S1205)) of the radio buttons can be selected. When the improvement proposal of the second row is selected, the radio button 1622 becomes black, and the improvement proposal of the third row is unselected, and thus, the radio button 1623 thereof becomes white.

Thus, according to the present embodiment, it is possible to optimize the usage cost estimate of the public cloud while taking into consideration the connective configuration in which an on-premise/public cloud is used, prior to the start of operation of a hybrid cloud configuration.

It should be noted that this disclosure is not limited to the above-mentioned embodiments, and encompasses various modification examples and the equivalent configurations within the scope of the appended claims without departing from the gist of this disclosure. For example, the above-mentioned embodiments are described in detail for a better understanding of this disclosure, and this disclosure is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

What is claimed is:

1. A management method executed by a management device that manages a usage configuration of a service provided between first devices of a first device group and second devices of a second device group,
   wherein the management device has a processor that executes a program, and a storage device that stores the program,
   wherein the storage device has a configuration management table, a cost calculation rule table, and a performance/capacity history table,
   wherein the configuration management table stores a first storage region of the first devices, a second storage region of the second devices, and a type of the usage configuration,
   wherein the performance/capacity history table stores an observation item in the first storage region, an observation value pertaining to the observation item, and an acquisition date/time of the observation value,
   wherein the cost calculation rule table stores one or more cost calculation formulas that serve as rules for calculating a cost for use of the second storage region according to the type of the usage configuration on the basis of at least one of the first storage region, the observation value, and the acquisition date/time, and
   wherein, in the management method, the processor executes:
   an acquisition process of acquiring configuration management information including at least the first storage region and the second storage region;
   an extraction process of extracting, from the cost calculation rule table, the cost calculation formula in the second storage region included in the configuration management information acquired in the acquisition process;
   a first calculation process of calculating a cost estimate value by the cost calculation formula by acquiring, from the performance/capacity history table, a value to be substituted in as a variable of the cost calculation formula;
   a creation process of creating a cost estimate result including a cost estimate value calculated in the first calculation process, the first storage region, the second storage region, and the type of the usage configuration using the second storage region; and
   an output process of outputting the cost estimate result created in the creation process.

2. The management method according to claim 1,
   wherein the processor executes a determination process of determining whether the configuration management information includes the second storage region and the type of the usage configuration, and
   wherein, in the extraction process, the processor extracts the cost calculation formula on the basis of the determination result by the determination process.

3. The management method according to claim 2,
   wherein the processor executes a determination process of determining whether the configuration management information includes the second storage region and the type of the usage configuration,
   wherein, in the extraction process, if the second storage region and type of the usage configuration are included according to the determination process, the processor extracts a specific cost calculation formula that uses the second storage region according to the type of the usage configuration,
   wherein, in the first calculation process, the processor calculates a specific cost estimate value by the specific cost calculation formula by acquiring, from the performance/capacity history table, a value to be substituted in as a variable of the specific cost calculation formula, and
   wherein, in the creation process, the processor creates a cost estimate result including the specific cost estimate value calculated in the first calculation process, the second storage region, and the type of the usage configuration.

4. The management method according to claim 2,
   wherein the processor executes a determination process of determining whether the configuration management information includes the second storage region and the type of the usage configuration,
   wherein, in the extraction process, if the second storage region and type of the usage configuration are not included according to the determination process, the processor extracts the cost calculation formula for all combinations of the second storage regions and the usage configurations in the cost calculation rule table,
   wherein, in the first calculation process, the processor calculates the cost estimate value by the cost calculation formula for each of the combinations by acquiring, from the performance/capacity history table, a value to be substituted in as the variable of the cost calculation formula, and wherein, in the creation process, the processor creates a cost estimate result including, for each of the combinations, the cost estimate value calculated in the first calculation process, the second storage region, and the type of the usage configuration.

5. The management method according to claim 4, wherein the storage device stores a policy table that stores a policy that defines a restriction condition, and wherein, in the creation process, the processor creates the cost estimate result for the combination that satisfies the restriction condition.

6. The management method according to claim 1, wherein the cost calculation rule table stores one or more cost calculation formulas that serve as rules for calculating a cost estimate value for use of the first storage region according to the type of the usage configuration on the basis of at least one of the second storage region, the observation value, and the acquisition date/time, wherein, in the extraction process, the processor extracts, from the cost calculation rule table, the cost calculation formula in the first storage region included in the configuration management information, and wherein, in the creation process, the processor executes creation of a cost estimate result including the cost estimate value, the first storage region, the second storage region, and the type of the usage configuration using the first storage region.

7. The management method according to claim 1, wherein the storage device has a cost management table, wherein the cost management table stores a performance value of a service cost for a provider device that provides the service among the first device group and the second device group, wherein, in the acquisition process, the processor acquires a statistical value of a total of the service cost with reference to the cost management table, and wherein, in the output process, the processor outputs the cost estimate result separately from the statistical value of the total of the service cost acquired in the acquisition process.

8. The management method according to claim 1, wherein the storage device has an improvement proposal table, wherein the improvement proposal table stores the type of the usage configuration, and one or more variable setting values that can be set to the variable of the cost calculation formula corresponding to the type of the usage configuration, and wherein the processor executes a second calculation process of calculating an improvement cost by the cost calculation formula by acquiring, from the improvement proposal table, the variable setting value to be substituted in as the variable of the cost calculation formula, and, in the output process, outputs a calculation result of the second calculation process.

9. The management method according to claim 8, wherein the improvement proposal table stores the type of the usage configuration, one or more improvement variables included in the cost calculation formula corresponding to the type of the usage configuration, and one or more of the variable setting values that can be set to the improvement variables, and wherein, in the second calculation process, the processor calculates the improvement cost for each combination of the improvement variable and the variable setting value.

10. A management device that manages a usage configuration of a service provided between first devices of a first device group and second devices of a second device group, the management device comprising:

a processor that executes a program; and
a storage device that stores the program,
wherein the storage device has a configuration management table, a cost calculation rule table, and a performance/capacity history table,
wherein the configuration management table stores a first storage region of the first devices, a second storage region of the second devices, and a type of the usage configuration,
wherein the performance/capacity history table stores an observation item in the first storage region, an observation value pertaining to the observation item, and an acquisition date/time of the observation value,
wherein the cost calculation rule table stores one or more cost calculation formulas that serve as rules for calculating a cost for use of the second storage region according to the type of the usage configuration on the basis of at least one of the first storage region, the observation value, and the acquisition date/time, and
wherein the processor executes:
an acquisition process of acquiring configuration management information including at least the first storage region and the second storage region;
an extraction process of extracting, from the cost calculation rule table, the cost calculation formula in the second storage region included in the configuration management information acquired in the acquisition process;
a first calculation process of calculating a cost estimate value by the cost calculation formula by acquiring, from the performance/capacity history table, a value to be substituted in as a variable of the cost calculation formula;
a creation process of creating a cost estimate result including a cost estimate value calculated in the first calculation process, the first storage region, the second storage region, and the type of the usage configuration using the second storage region; and
an output process of outputting the cost estimate result created in the creation process.

11. A non-transitory recording medium that can be read by a processor, the recording medium recording a management program that causes the processor to execute management of a usage configuration of a service provided between first devices of a first device group and second devices of a second device group, wherein the processor can access a storage device that stores a configuration management table, a cost calculation rule table, and a performance/capacity history table, wherein the storage device has a configuration management table, a cost calculation rule table, and a performance/capacity history table, wherein the configuration management table stores a first storage region of the first devices, a second storage region of the second devices, and a type of the usage configuration, wherein the performance/capacity history table stores an observation item in the first storage region, an observation value pertaining to the observation item, and an acquisition date/time of the observation value, wherein the cost calculation rule table stores one or more cost calculation formulas that serve as rules for calculating a cost for use of the second storage region according to the type of the usage configuration on the basis of at least one of the first storage region, the observation value, and the acquisition date/time, and wherein the processor is caused to execute:

an acquisition process of acquiring configuration management information including at least the first storage region and the second storage region;

an extraction process of extracting, from the cost calculation rule table, the cost calculation formula in the second storage region included in the configuration management information acquired in the acquisition process;

a first calculation process of calculating a cost estimate value by the cost calculation formula by acquiring, from the performance/capacity history table, a value to be substituted in as a variable of the cost calculation formula;

a creation process of creating a cost estimate result including a cost estimate value calculated in the first calculation process, the first storage region, the second storage region, and the type of the usage configuration using the second storage region; and an output process of outputting the cost estimate result created in the creation process.

* * * * *